(12) United States Patent
Smith et al.

(10) Patent No.: US 11,117,420 B2
(45) Date of Patent: Sep. 14, 2021

(54) WHEEL RIM GUARD

(71) Applicants: Elvin Smith, Charleston, WV (US); Mark Allen, Mount Nebo, WV (US)

(72) Inventors: Elvin Smith, Charleston, WV (US); Mark Allen, Mount Nebo, WV (US)

( * ) Notice: Subject to any disclaimer, the term of this patent is extended or adjusted under 35 U.S.C. 154(b) by 0 days.

(21) Appl. No.: 16/571,355

(22) Filed: Sep. 16, 2019

(65) Prior Publication Data
US 2020/0009904 A1    Jan. 9, 2020

Related U.S. Application Data

(63) Continuation-in-part of application No. 15/962,078, filed on Apr. 25, 2018, now Pat. No. 10,413,928.

(51) Int. Cl.
| | |
|---|---|
| *B60B 7/04* | (2006.01) |
| *B05B 12/30* | (2018.01) |
| *B05B 12/20* | (2018.01) |
| *B60B 7/00* | (2006.01) |
| *B60B 7/06* | (2006.01) |

(52) U.S. Cl.
CPC ............. *B60B 7/04* (2013.01); *B05B 12/20* (2018.02); *B05B 12/30* (2018.02); *B60B 7/0073* (2013.01); *B60B 7/063* (2013.01); *B60B 2900/212* (2013.01)

(58) Field of Classification Search
CPC ........... B60B 7/04; B05B 12/20; B05B 12/00; B05B 12/22; B05B 12/26; B05B 12/30; B05B 3/042
See application file for complete search history.

(56) References Cited

U.S. PATENT DOCUMENTS

| | | | | |
|---|---|---|---|---|
| 2,627,839 | A * | 2/1953 | Hudgins | B05B 12/30 |
| | | | | 118/505 |
| 6,179,387 | B1 * | 1/2001 | Nasset, Sr. | B05B 12/30 |
| | | | | 301/37.102 |
| 6,227,623 | B1 * | 5/2001 | Bellow | B05B 12/30 |
| | | | | 301/37.42 |
| 6,863,353 | B1 * | 3/2005 | Buckner | B60B 7/0073 |
| | | | | 301/37.103 |
| 7,806,484 | B1 * | 10/2010 | Young | B60J 11/10 |
| | | | | 301/37.104 |
| 9,713,819 | B1 * | 7/2017 | Wilson | B05B 12/30 |
| 10,413,928 | B2 * | 9/2019 | Smith | B60B 7/04 |
| 2007/0013226 | A1 * | 1/2007 | Updegraph | B60B 7/0073 |
| | | | | 301/37.104 |
| 2018/0086137 | A1 * | 3/2018 | Smith | B60B 7/02 |

* cited by examiner

*Primary Examiner* — Jason R Bellinger
(74) *Attorney, Agent, or Firm* — York Law LLC; Olen L. York, III

(57) ABSTRACT

A wheel rim guard includes a body having an outer surface and an inner surface each radiating from a central point and the outer surface and the inner surface each co-terminating and defining a circumferential peripheral edge. The guard also includes a returnably-resilient seal disposed along the circumferential peripheral edge, the seal engaging a wheel rim berm. The guard also includes a handle depending from the outer surface of the body.

20 Claims, 8 Drawing Sheets

WHEEL RIM GUARD

I. RELATED APPLICATIONS

This application is a continuation-in-part of U.S. application Ser. No. 15/962,078, filed on Apr. 25, 2018, issued on Sep. 17, 2019 as U.S. Pat. No. 10,413,928 B2, which is a continuation-in-part of U.S. application Ser. No. 15/280,830 filed on Sep. 29, 2016 and is now abandoned.

II. FIELD OF THE INVENTION

This application discloses claims and embodiments generally related to a wheel rim guard for facilitating cleaning of automobile tires.

III. BACKGROUND OF THE INVENTION

Numerous attempts have been made to improve the application of cleaner to a surface that is adjacent to other surfaces, wherein one surface is intended to receive such cleaning solution and adjacent surfaces are to be cleaned in a separate manner. For example, a vehicle tire is mounted to a wheel rim that is mechanically coupled to the axle of the vehicle. Wheel rims are constructed of a variety of materials, including alloy (e.g., magnesium and aluminum), magnesium, aluminum, chrome, and other similar materials. Because such materials are expensive and easily marred or stained, a number of attempts have been offered that prevent such cleaners, polishes, and other such materials from corroding, marring, or otherwise leaving behind unwanted cleaning residue(s).

For example, U.S. Pat. No. 6,863,353 (issued to Buckner) discloses a domed covering element sized to cover and protect the entire wheel rim while leaving the tire fully exposed. A handle member is fixedly attached to a central portion of the convex side of the covering element to allow the user to easily and rapidly put the present invention into position and maintain it there with the use of just one hand so the other is free to spray or brush on the tire dressing. The domed shape of the covering element keeps the user's hand away from the dressing solution during the application thereof as well as protecting the wheel rim from getting scuffed from contact with the surface of the covering element. The invention may include a resilient, compressible gasket which encompasses the periphery of the covering element to form an impermeable seal when a slight pressure is applied thereto. The gasket assures that no solution will pass therethrough and contact the wheel rim even when heavily applied.

Accordingly, a need exists for an apparatus, device, and/or system capable of shielding the wheel rim during application of cleaning or polishing materials in a manner or manners not disclosed by Buckner and other related attempts in the art.

IV. SUMMARY OF THE INVENTION

The present invention provides an improved wheel rim guard apparatus having the general purpose of shielding the wheel rim of a vehicle from inadvertent application of cleaning or polishing material(s) and to prevent staining and/or marring of the wheel rim.

In one embodiment, a wheel rim guard comprises a body including an outer surface and an inner surface, the outer surface and the inner surface each radiating from a central point and the outer surface and the inner surface each co-terminating and defining a circumferential peripheral edge, a returnably-resilient seal disposed along the circumferential peripheral edge, the seal including an outer layer and an inner core, the outer layer comprising non-reactive material, and the inner core comprising compressible, returnably-resilient material, the seal engaging a wheel rim, and, a handle depending from the outer surface of the body. The guard may further comprise a foot depending from the peripheral edge.

In such an embodiment, the body comprises a first reinforcement element, wherein the first reinforcement element is disposed at the center of the body. It is further envisioned that the body comprises a second reinforcement element, wherein the second reinforcement element is disposed in spaced-relation to the first reinforcement element. It is also envisioned that the body comprises support spines.

Also, in such an embodiment, the seal is displaced to form a first elongated portion and a second elongated portion, the first elongated portion and the second elongated portion forming a double-barrier of impermeability about the wheel rim. In an alternative embodiment, the seal further comprises a defined pre-set indentation formed between the circumferential margins of the seal, the defined pre-set indentation for aligning with the wheel rim, and wherein the defined pre-set indentation forms a first elongated portion and a second elongated portion.

In another embodiment, a wheel rim guard comprises a dome-shaped body including an outer surface and an inner surface, the outer surface and the inner surface comprising curvilinear forms, the outer surface and the inner surface each radiating from a central point and the outer surface and the inner surface each co-terminating and defining a circumferential peripheral edge, a returnably-resilient seal disposed along the circumferential peripheral edge, the seal including an outer layer and an inner core, the outer layer comprising non-reactive material, and the inner core comprising compressible, returnably-resilient material, and, a handle depending from the outer surface of the body. The guard may further comprise a foot depending from the peripheral edge. The guard may further comprise a linkage intermediately disposed between the handle and the seal, wherein the handle articulates to lengthen or shorten the linkage.

In such an embodiment, the body may further comprise a variety of additional configurations or arrangements, separate or in combination. For example, the body may further comprise a plurality of support spines. In another example, the body may further comprise a rotatable platform supporting the handle. In another example, the body may comprise a first reinforcement element. In one embodiment, the body comprises a uniform thickness. In an alternative embodiment, the body comprises a non-uniform thickness, the body having a greater thickness at the center and a less thickness at the circumferential peripheral edge.

Similarly, in such an embodiment, the seal may comprise a variety of configurations and/or arrangements. For example, in one embodiment, the seal engages the wheel rim and is displaced to form a first elongated portion and a second elongated portion, the first elongated portion and the second elongated portion forming a double-barrier of impermeability about the wheel rim. In another embodiment, the seal further comprises a defined pre-set indentation formed between the circumferential margins of the seal, the defined pre-set indentation for aligning with the wheel rim, and wherein the defined pre-set indentation forms a first elongated portion and a second elongated portion, the first elongated portion and the second elongated portion forming a double-barrier of impermeability about the wheel rim.

V. BRIEF DESCRIPTION OF THE DRAWING(S)

The advantages and features of the present invention will become better understood with reference to the following more detailed description and claims taken in conjunction with the accompanying drawings, in which like elements are identified with like symbols, and in which:

Figure 15:
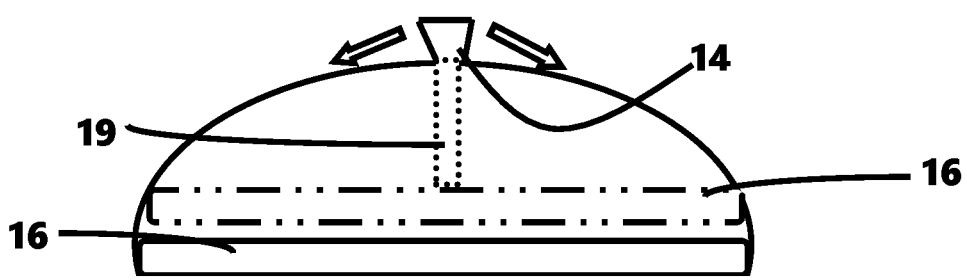
FIG. 15 is a rear view of the guard with handle illustrating the articulated movement of the handle.
Figure 16:
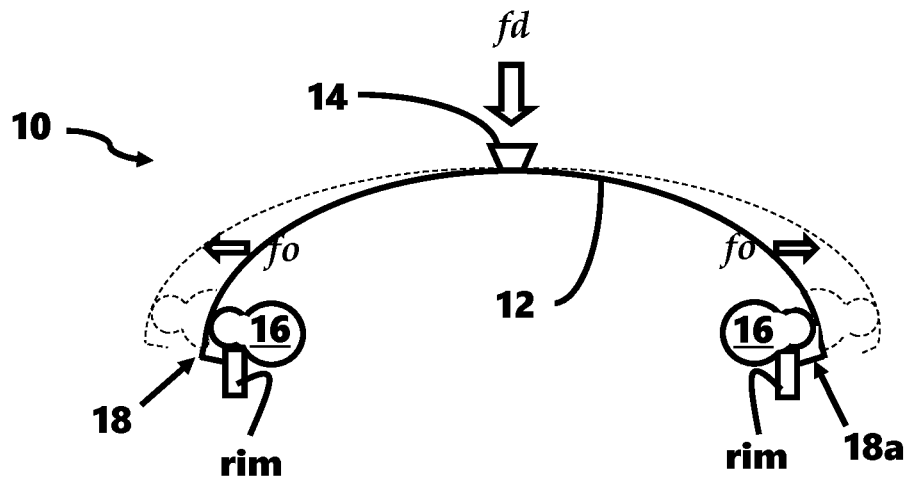
Figure 17:
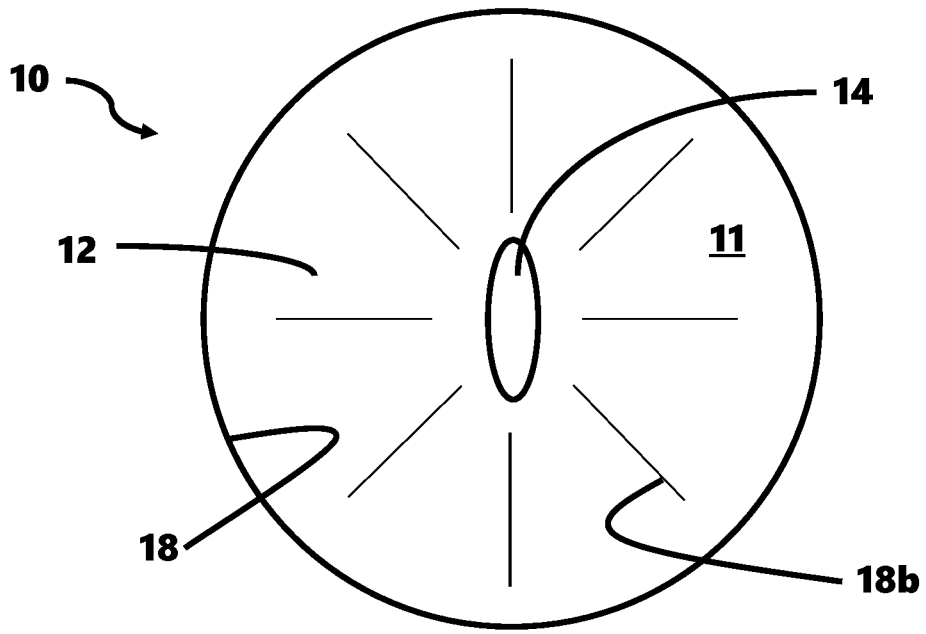
Figure 18:
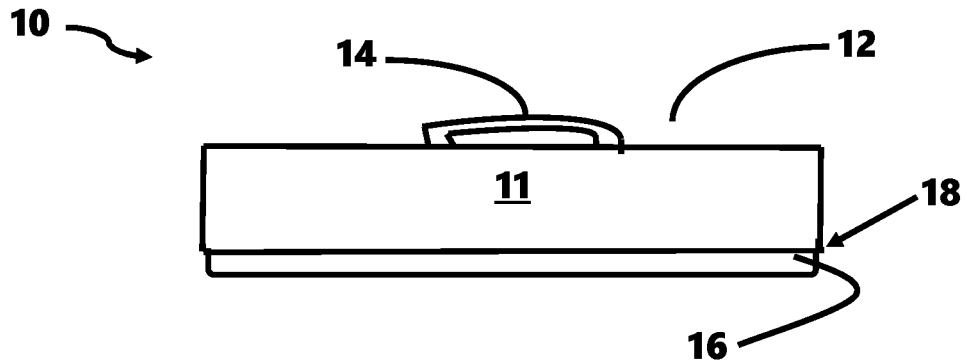
Figure 19:
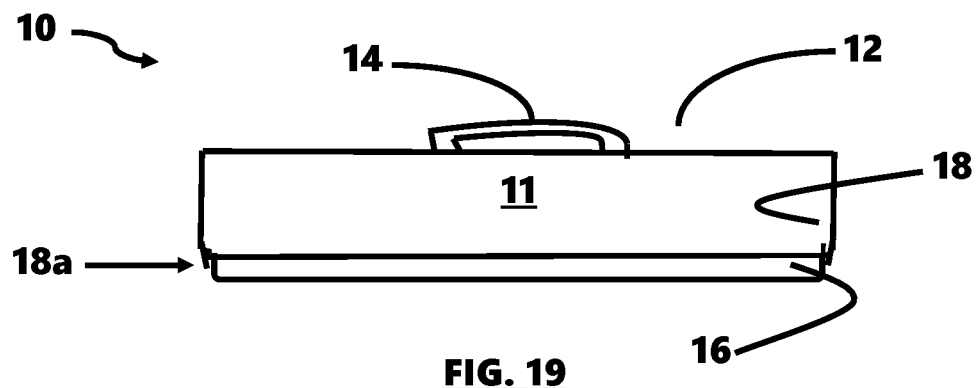
Figure 20:
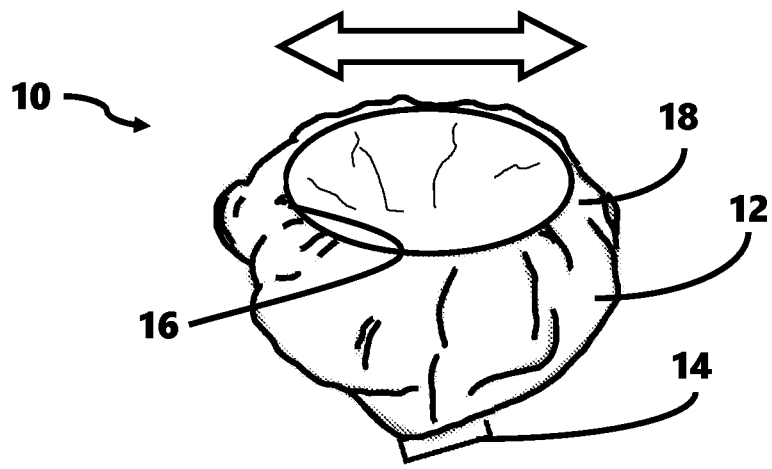

FIG. 16. is a sectional view of FIG. 15 taken along XVI-XVI;

FIG. 17 is top view of a guard having support spines;

FIG. 18 is a side view of a guard having a linear and orthogonal form;

FIG. 19 is a side view of a guard having a similar structure to FIG. 18 and having a foot; and FIG. 20 is a perspective view of a guard comprising a flexible material.

VI. DETAILED DESCRIPTION OF THE EMBODIMENT(S)

It will be readily understood that the components of the present invention, as generally described and illustrated in the figures herein, may be arranged and designed in a wide variety of different configurations. Thus, the following detailed description of the embodiments, as represented in the attached figures, is not intended to limit the scope of the invention as claimed, but is merely representative of selected embodiments of the invention.

The features, structures, or characteristics of the invention described throughout this specification may be combined in any suitable manner in one or more embodiments. For example, the usage of the phrases "example embodiments", "some embodiments", or other similar language, throughout this specification refers to the fact that a particular feature, structure, or characteristic described in connection with the embodiment may be included in at least one embodiment of the present invention. Thus, appearances of the phrases "example embodiments", "in some embodiments", "in other embodiments", or other similar language, throughout this specification do not necessarily all refer to the same group of embodiments, and the described features, structures, or characteristics may be combined in any suitable manner in one or more embodiments.

Referring to FIG. 1 through FIG. 20, a wheel rim guard 10 comprises a body 12, a handle 14 (depending from the body 12), and a returnably-resilient seal 16 disposed along the circumferential peripheral edge or lip 18 of the guard 10. The body 12 comprises an outer surface 11 and an inner surface 13, a thickness (t) defining the region intermediately disposed between surfaces 11, 13. Surfaces 11, 13 radiate from a center (C) position and that co-terminate at the circumferential peripheral edge or lip 18.

It is envisioned that the body 12 and surfaces 11, 13 may be configured in a variety of forms and/or arrangements. For example, in FIG. 1 through FIG. 3, the body 12 and surface 11, 13 are curvilinear in form radiating from the center (C) and define a dome-shaped body 12 and are formed from a semi-rigid or rigid material. In another example, consistent with FIGS. 18 and 19, the body 12 and surfaces 11, 13 are formed in parallel along a plane that is parallel to a floor or ground and the surfaces 11, 13 co-terminate at and define a peripheral edge or lip 18 defined by a circumferential sidewall downwardly depending from the surfaces 11, 13 and are formed from a semi-rigid or rigid material. In another example, consistent with FIG. 20, the body 12 and surfaces 11, 13 are formed from a highly elastic material so that the form of the surfaces 11, 13 (and body 12) are adapted to take form of any object, article, or surface it is placed.

Figure 1:
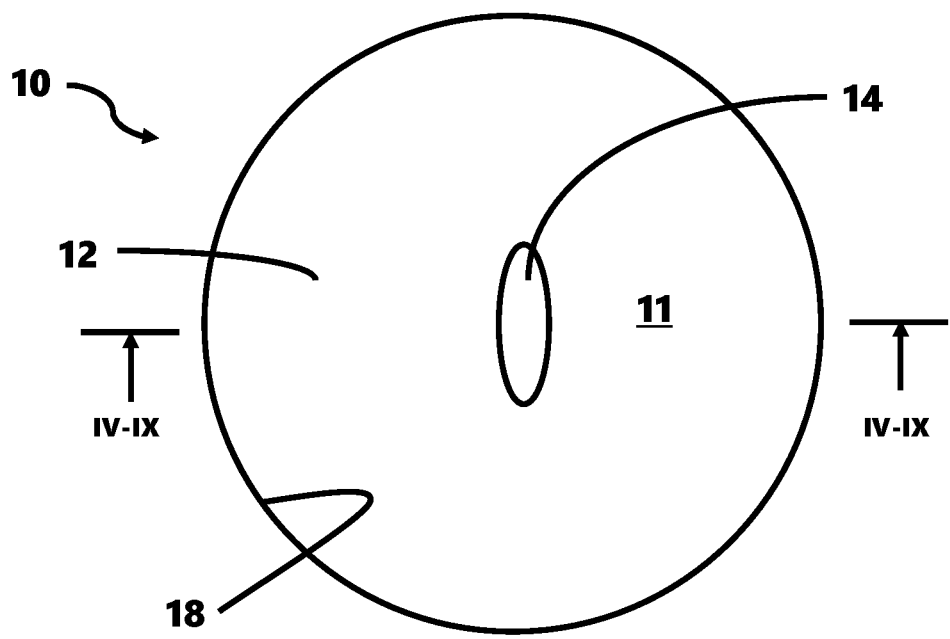
FIG. 1 is a top view of a wheel rim guard.
Figure 2:
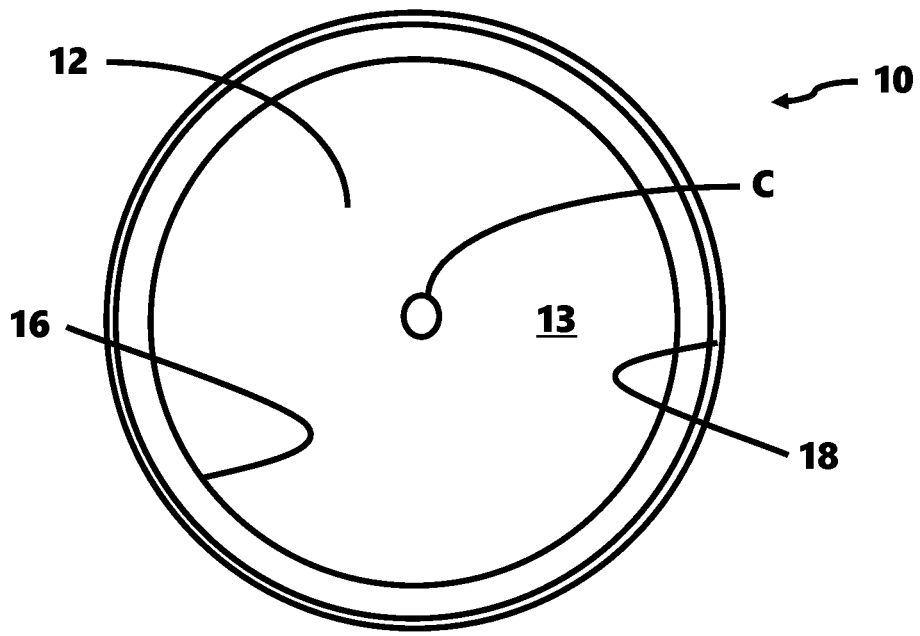
FIG. 2 is an underside view of the wheel rim guard of FIG. 1.
Figure 3:
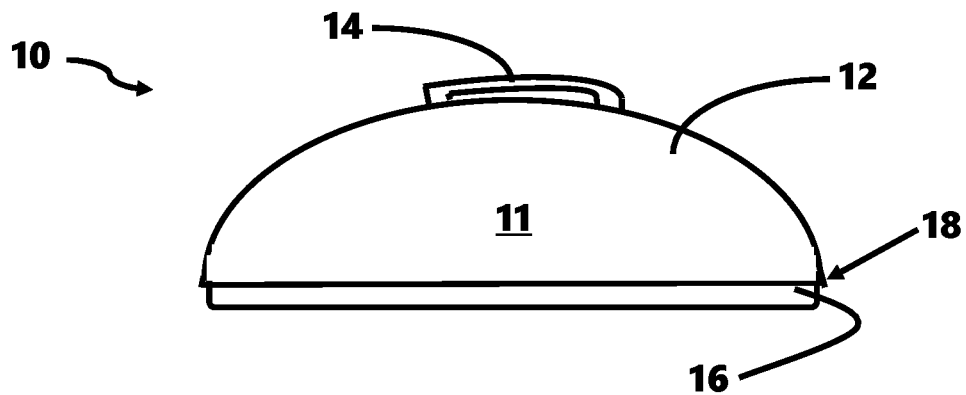
FIG. 3 is a side view of the wheel rim guard of FIGS. 1 and 2.
Figure 4:
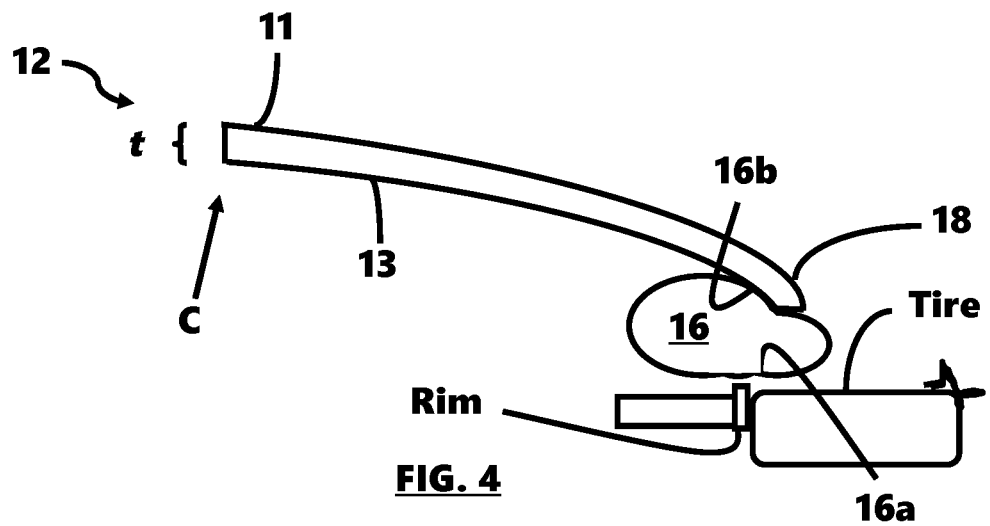
FIG. 4 is a sectional view of the guard taken along IV-IV of FIG. 1 and having a uniform thickness from the center (C) to the edge or lip 18.
Figure 5:
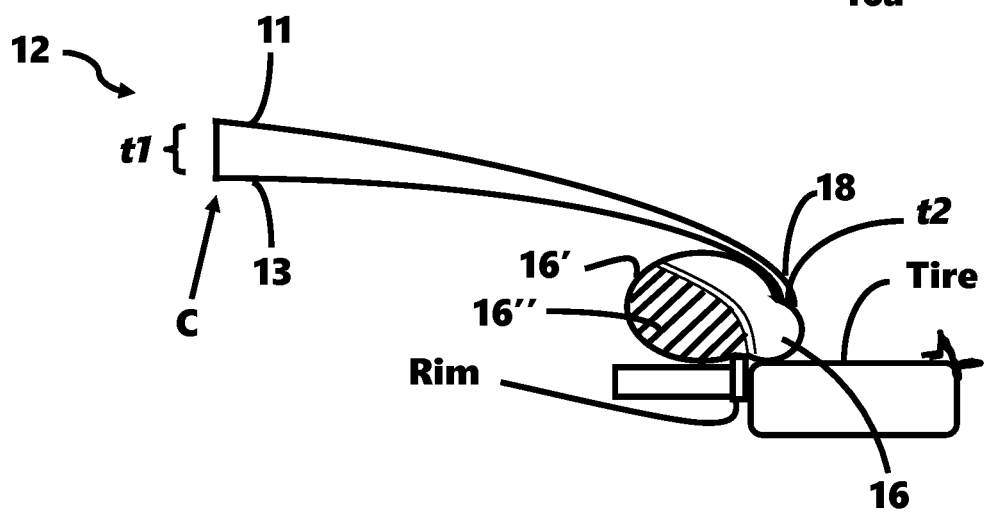
FIG. 5 is a sectional view of the guard taken along V-V of FIG. 1 and having a non-uniform (tapered) thickness from the center (C) to the edge or lip 18.

In another embodiment, consistent with FIG. 4, the thickness (t) is substantially uniform from the center (C) to the peripheral edge or lip 18, therefore surfaces 11, 13 are substantially uniform from center (C) to edge or lip 18. In alternative embodiments, as exemplified in FIG. 5 through FIG. 8, the thickness at the center (C) (denoted by t1) is greater than the thickness at the peripheral edge or lip 18 (denoted by t2). The increased thickness at the center (C) of the body 12 fortifies the structure and absorbs a considerable quantity of the force(s) imparted by the user upon the device as delivered through the handle 14 (as coupled or joined to the body 12 at or near the center (C)). In another embodiment, as depicted generally by FIG. 20, the thickness (t) of the body 12 (defined by surfaces 11, 13) is uniform and consistent and sufficiently thick to be impermeable to aerosols, liquids, and other detergents and/or chemicals utilized in tire-cleaning solutions.

When a user imparts force upon the handle 14 (and the force is transferred through the handle 14 to the body 12 and to the returnably-resilient seal 16), regardless of the thickness (t) of the body 12, and consistent with FIG. 4 through FIG. 8, the transfer of such force(s) causes a temporary deformity in the seal 16 at the point-of-contact with the wheel rim (berm). The temporary deformity in the seal 16 results in a double-seal, with one portion of the seal 16 laterally bulging beyond the perimeter of the peripheral edge or lip 18 (and superjacent the wheel rim (berm) (generally denoted by 17*a*) and another portion of the seal 16 laterally bulging subjacent the wheel rim (berm) (generally denoted by 17*b*). This double-seal forms an impermeable seal superjacent the wheel rim (berm), at the point-of-contact with the wheel rim (berm), and subjacent the wheel rim (berm), providing heightened damming of any cleaning solution immediately superjacent the wheel rim (berm), and therefore, completely protecting the wheel rim from chemical damage.

Figure 6:
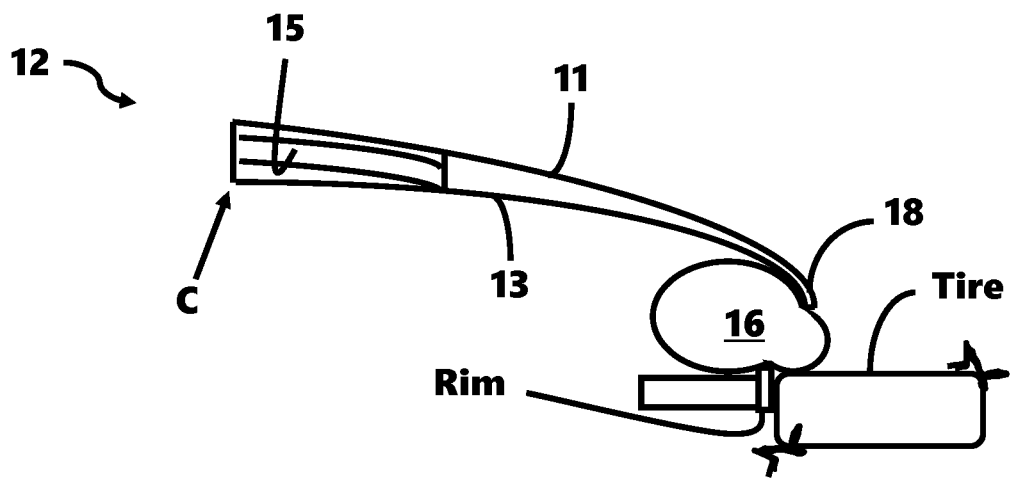
FIG. 6 is a sectional view of the guard taken along VI-VI of FIG. 1 and having a non-uniform (tapered) thickness from the center (C) to the edge or lip 18; and a reinforcement element at the center (C)
Figure 7:
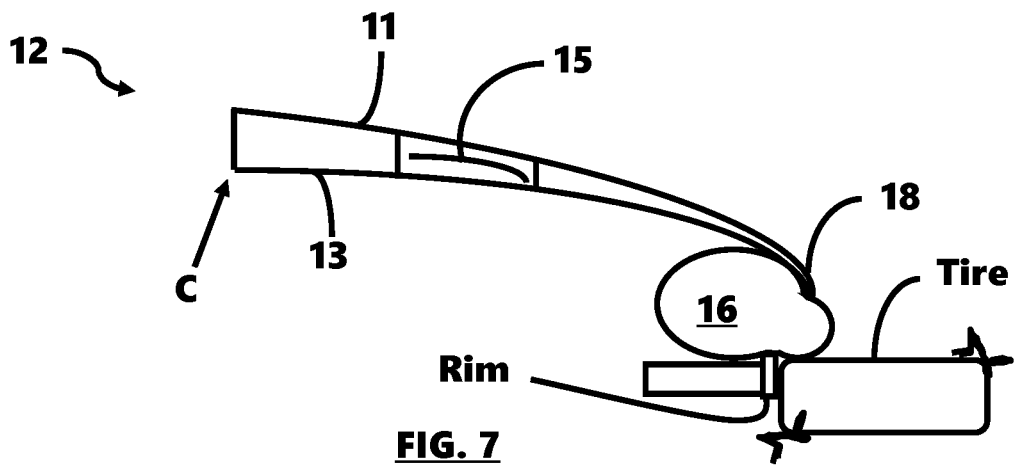
FIG. 7 is a sectional view of the guard taken along VII-VII of FIG. 1 and having a non-uniform (tapered) thickness from the center (C) to the edge or lip 18; and a reinforcement element disposed away from the center (C)
Figure 8:
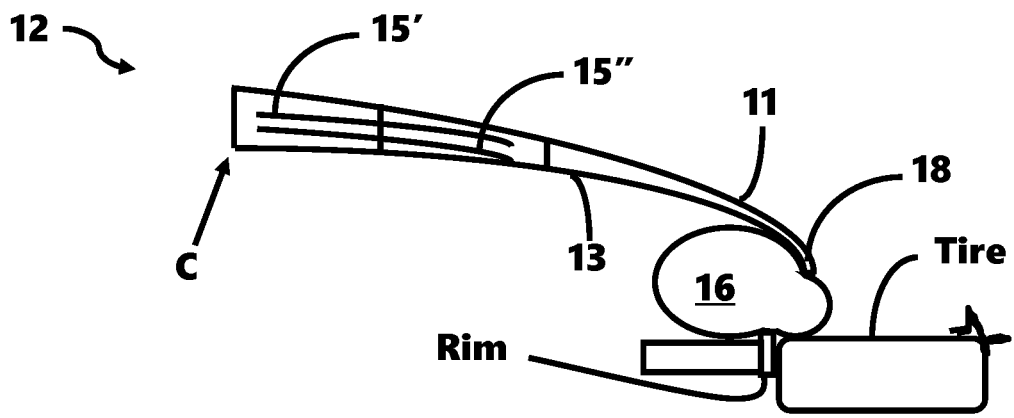
FIG. 8 is a sectional view of the guard taken along VIII-VIII of FIG. 1 and having a non-uniform (tapered) thickness from the center (C) to the edge or lip 18; and a reinforcement element at the center (C) and adjacent the reinforcement element at the center (C)

In FIG. 6 through FIG. 8, the body 12 is depicted as including one or more reinforcement elements 15 (or 15' and 15"). In FIG. 6, the reinforcement element 15 is disposed at the center (C) of the body 12, with the reinforcement element 15 centered at the center (C) and the terminal edge of the element 15 forming a radius. In FIG. 7, the reinforcement element 15 is disposed at a distance but concentric to the center (C) of the body and may be envisioned as forming a band or ring concentric to and in spaced-relation to the center (C). In FIG. 8, the embodiments of FIG. 6 and FIG. 7 are combined so that there are two reinforcement elements (15' and 15"), with the first reinforcement element (15') formed and disposed at the center (C) and with the second reinforcement element (15") formed as a band or ring concentric to and in spaced-relation to the center (C). It is further envisioned that the body 12 may include additional reinforcement elements beyond the number illustrated in the figures, such as three, four, or five or more rings or bands of the material incorporated therein. It is envisioned that the reinforcement element(s) 15 (or 15' and/or 15") may comprise a variety of materials, including metal(s), alloy(s), plastic(s), rubber(s), and/or a combination thereof.

Consistent with the illustrations, the returnably-resilient seal 16 is envisioned to comprise a variety of shapes or forms, including the toroidal shape generally illustrated herewith, but also may include other shapes or forms such as disk-shaped. It is envisioned that the seal 16 may comprise a variety of materials. Included in the materials, but not exhaustive, are such compositions as rubber, silicone, nitrile butadiene rubber (NBR) sold under the brand names of Perbunan®, Nipol®, Krynac®, and Europrene®, synthetic polymer and fluoroelastomer (FKM) sold under the brand name VITON™, and perfluoroelastomers (FFKM) sold under the brand name KALREZ®. In addition, it is envisioned that the seal 16 may comprise a thin sheet of plastic or polymer material that includes a removable and/or separable backing that when removed exposes a ring of adhesive that may be used to apply the guard 10 against the wheel rim. In one embodiment, the thin sheet of plastic or polymer material may be provided as a separate item, such as on a roll or as part of a package, wherein a single sheet of the plastic or polymer material may be selected, wherein a first backing and a second backing may be removed to apply the sheet to the wheel rim or to the underside of the guard 10, and the opposing side applied to the remaining surface (either the wheel rim or the underside of the guard 10). Each of these compositions may be used separately or in combination with the others to form the durable, returnably-resilient seal 16 envisioned for repeated usage and exposure to harsh cleaning chemical solutions. Thus, the seal 16 must be formed from material capable of withstanding the harsh chemical detergents and abrasives included for removing the combination of oil, dirt, and grime that collects on the tire surface.

In particular, it is envisioned that the seal 16 may comprise a solid single-unit comprising one or more materials. As illustrated and best viewed in FIG. 5, it is also envisioned that the seal 16 may comprise an outer layer 16' and an inner core 16" (filling), wherein the outer layer 16' is impermeable to liquids/solutions and/or foams, is non-reactive to the chemicals included in the liquids/solutions/foams, and provides some resilience to force and/or pressure. The inner core 16" (filling) is envisioned to be of a compressible material that deforms under stress (caused by an urging force or pressure transferred through the handle 14 to the body 12 and to the seal 16), but will exhibit returnably-resilient characteristics and will return to its general starting shape or form once the force or pressure has been removed. It is also preferable that the inner core 16" (filling) is similarly non-reactive to the chemicals included in the liquids/solutions/foams used on tires and the like.

It is further envisioned that the body 12, handle 14, seal 16, and the constituent elements of each, are constructed as a single, unitary structure manufactured from a single material composition. Similar to the embodiments depicted in FIGS. 5-9, and the description pertinent thereto, the body 12 includes a center (C) region that is thicker (t1) than the peripheral edge or lip 18 (t2), the greater thickness at the center (C) (t1) to accommodate the force(s) applied by the user onto the handle 14 and transferred into the body 12 and to the seal 16 disposed at or near the peripheral edge or lip 18. It is envisioned that construction and/or manufacture from a single material composition would reduce the expense of manufacturing each unit.

Figure 9:
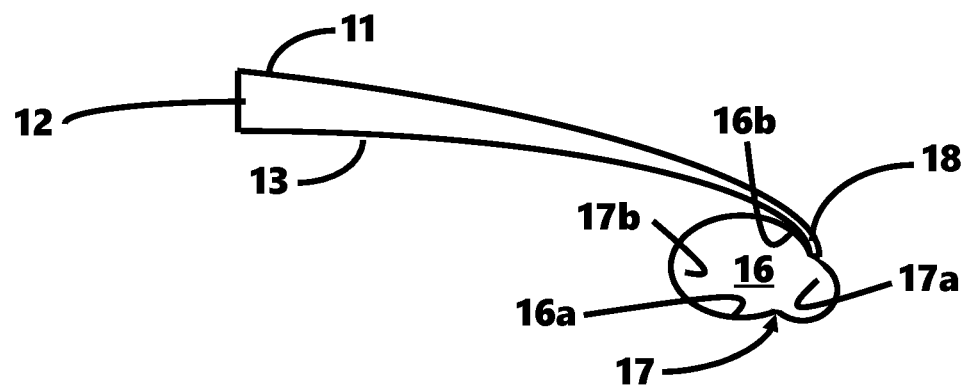
FIG. 9 is a sectional view of the guard taken along IX-IX of FIG. 1 and having an indentation formed in the seal.
Figure 10:
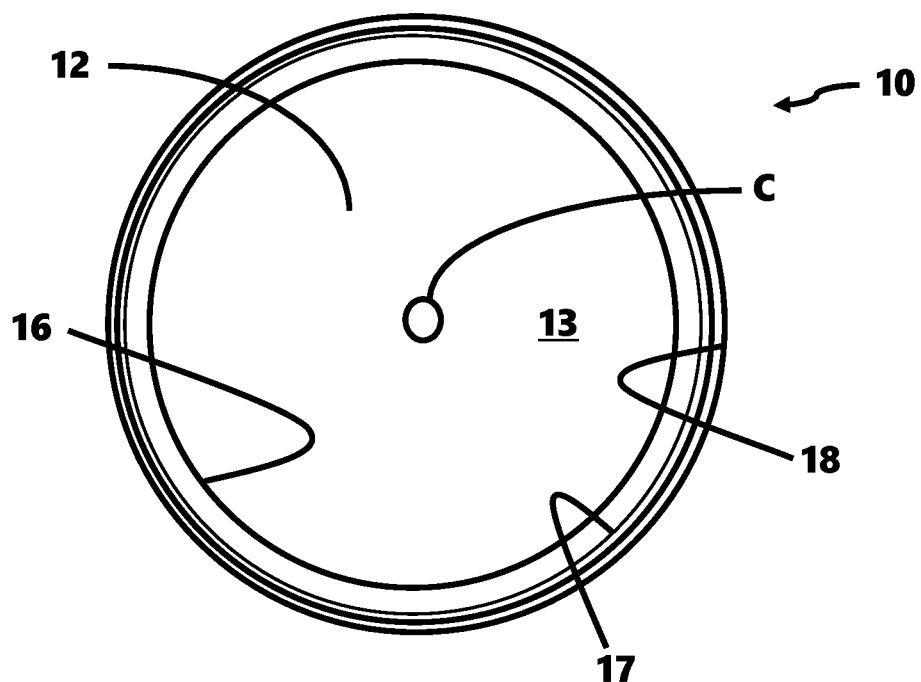
FIG. 10 is an underside view of the guard illustrating the indentation formed in the seal.

Consistent with FIG. 9 and FIG. 10, seal 16 may comprise an obverse surface 16*a* and a reverse surface 16*b*. As generally illustrated in FIG. 4 and FIG. 9, the reverse surface 16*b* engages the inner surface 13 of the body 12 via coupling means, such as one or more industrial adhesive(s) compound(s), adhesive with removable backing, or a combination thereof. It is further envisioned that the reverse surface 16*b* may include a substrate or other support carrier by which the adhesive may be applied, and with the substrate or support carrier mechanically secured to the inner surface 13 (accomplished via mechanical fasteners) or with the substrate or support carrier adhesively secured to the inner surface 13 (consistent with the industrial adhesive(s) and application described above). It is additionally envisioned that a track or channel may be utilized, wherein the track or channel is attached to the inner surface 13 and the seal 16 is adhesively and/or mechanically coupled therein, with the track or channel serving as support for the seal 16 during usage.

As depicted in FIG. 4, the obverse surface 16*a* of seal 16 engages any external surfaces apart from the guard 10 device, and in particular, engages the wheel rim (berm). In one embodiment, in a non-engaged state, the seal 16 is generally consistent and smooth across the obverse surface 16*a* (see FIG. 4 for specific detail). Once engaged with the wheel rim (berm), the obverse surface 16*a* may experience a temporary indentation 17 formed therein. As previously described, the indentation 17 is formed through application of force or pressure by the user (via handle 14 and transferred through body 12 to the seal 16), yielding double-seal configuration with displacement of the outer layer and inner filling of the seal 16 to achieve points of contact superjacent the rim (berm), at the rim (berm), and subjacent the rim (berm). In another embodiment, consistent with FIG. 9 and FIG. 10, an indentation 17 may be pre-formed on the seal 16 between the radial (outer) margins of the seal 16. The indentation 17 may be provided for alignment with the rim (berm) of the wheel and for promotion of enlarging the bulging portions 17*a* and 17*b* formed through pressure at the indentation 17 point and displacement of outer and inner material of the returnably-resilient seal 16 structure.

Figure 11:
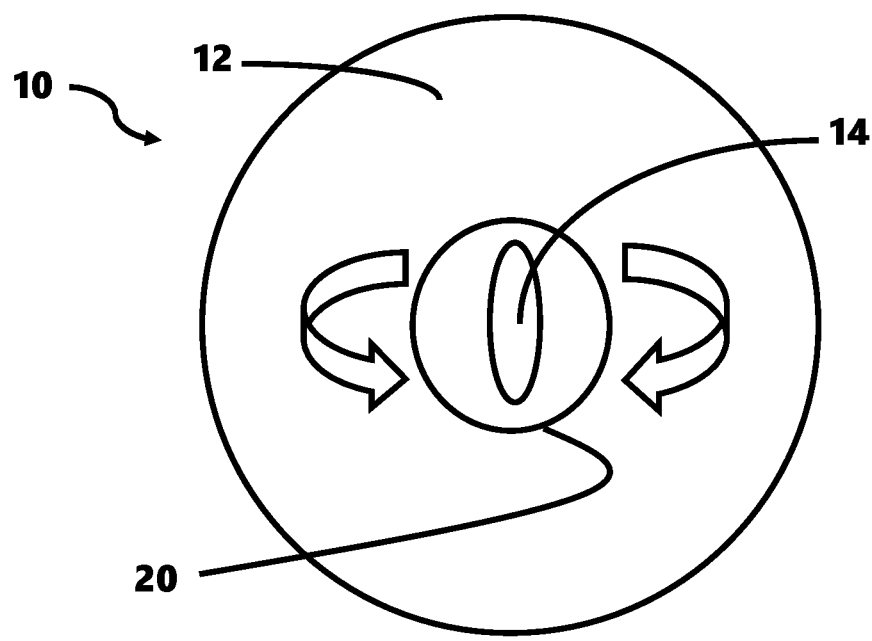
FIG. 11 is a top view of the guard with the handle supported by a rotatable platform.
Figure 12:
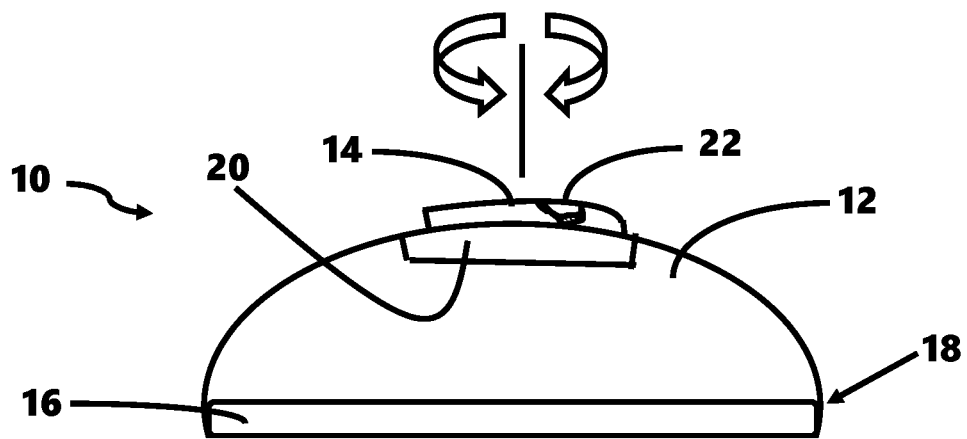
FIG. 12 is a side view of the guard with handle supported by a rotatable platform as in FIG. 11.
Figure 13:
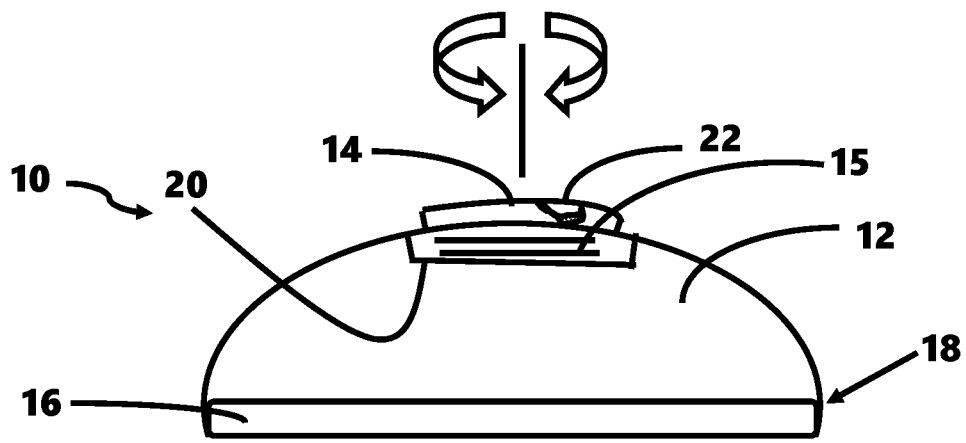
FIG. 13 is a side view of the guard with handle supported by rotatable platform and wherein the rotatable platform includes reinforcement element.

As depicted in FIG. 11 and FIG. 12, in another embodiment, the handle 14 may couple to a rotatable platform 20 disposed within the body 12 of the guard 10. The rotatable platform 20 is envisioned as rotating through 360 degrees in at least one orbital direction, whether it is clockwise or counterclockwise. It is further envisioned that the rotatable platform 20 rotates through 360 degrees in both clockwise and counterclockwise orbital directions. Consistent with FIG. 13, it is further envisioned that the rotatable platform 20 may comprise the reinforcement element material (disclosed above), wherein the rotatable platform 20 comprises thicker, denser material from the materials identified above and operates as a means for providing additional structural rigidity and durability at the point-of-contact between the handle 14 and the body 12. The rotatable platform 20 and the reinforcement element 15 may be separate components or may be an integrated, unitary component. The handle 14 may also include a depressible and/or releasable trigger 22 that locks and unlocks the rotation or otherwise operates as a release or a brake of the rotatable platform 20.

Figure 14:
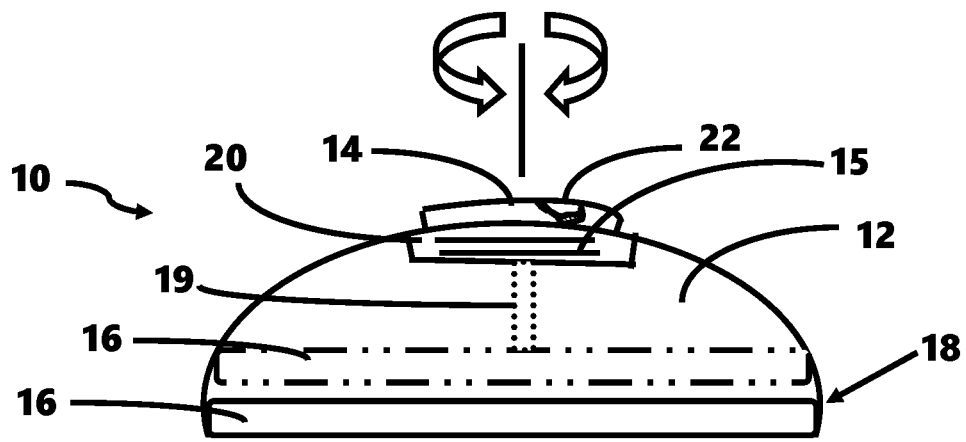
FIG. 14 is a side view of the guard with handle having a linkage coupled to the seal for expanded and retracted movement of the seal via the handle and linkage.

As depicted in FIG. 14 and FIG. 15, the handle 14 may be coupled to a linkage 19 that is coupled to and urges movement of the seal 16. In one embodiment, the handle 14 is articulated so that it may rotate to the one-side or the other, with the articulation to a side increasing the linkage length and urging the seal 16 into contact with a wheel rim (berm), and articulation back to center reduces the linkage length and contracts the seal 16 within the body 12 of the guard 10. It is also envisioned that the opposite orientation may be useful, wherein the handle 14 at center increases the linkage length and urges the seal 16 into contact with the wheel rim (berm) and in articulated position reduces the linkage length and contracts the seal 16 within the body 12 of guard 10. It is further envisioned that the handle 14 may articulate bi-directionally away from center, and the aforementioned orientations and actions may result. For example, at center, the handle 14 may be in a contracted state with the seal 16 contracted within the body 12 of the guard 10, and at an articulated position, the linkage length increases and urges the seal 16 into contact with the wheel rim (berm). Likewise, the reverse orientation may be achieved, with the handle 14 at center achieving urging of seal 16 into contact with the wheel rim (berm) and the articulated (non-center) position achieving retraction of the linkage length and the seal 16 within the body 12 of guard 10.

As depicted in FIG. 16, it is further envisioned that the guard 10 comprises material that is flexible, durable, and returnably resilient such that when a downward force (fd) is applied at the handle 14, and the force is transferred through the guard 10 toward the peripheral edge or lip 18, an outward force (fo) urges the peripheral edge or lip 18 outward, wherein the sloped foot 18a formed and/or disposed at the margin of the edge or lip 18 may be positioned to engage the outer circumferential margin of the rim of the wheel. Once the downward force (fd) is removed or the material overcomes the remaining residual force, the edge or lip 18 returns to an initial orientation or position, and the sloped foot 18a engages the margin of the rim, the seal 16 forms a double seal about the rim.

Consistent with FIG. 17, it is further envisioned that the body 12 may include a plurality of spines 18b. Each of the spines 18b begins at or near the center (C) of the body 12 and traverses near or at the peripheral edge or lip 18. Thus, each of the spines 18b may begin in the center (C), just beyond the center (C), or at some distance from the center (C). Likewise, each of the spines 18b may terminate at the edge or lip 18, near the edge or lip 18, or at some distance from the edge or lip 18. Moreover, it is contemplated that each spine 18b may begin and terminate in the various combinations and sub-combinations recited above. Each spine 18b is envisioned as providing support to the body 12 and assisting in the transfer and distribution of the applied force at the handle 14 (previously denoted by fd) to effectuate a relatively equal displacement of the peripheral edge or lip 18 for expansion for placement along the outer circumference of the rim of the wheel. Although eight spines 18b are depicted in FIG. 17, it is envisioned that the number of spines 18b is variable depending upon the size of the body 12, the thickness(es) utilized, the material utilized, and/or combinations of these considerations.

Consistent with FIG. 20, in another embodiment of the guard 10, the body 12 (and surfaces 11, 13) comprise a highly flexible material impermeable to aerosols and/or liquids. The body 12 includes a peripheral edge or lip 18 with a seal 16 adjacent thereto. The edge or lip 18 with seal 16 is expandable along the double-headed arrow to fit around the circumferential periphery of the wheel rim berm, and wherein the seal 16 may be released and returns to its starting form and is disposed in a firmly and securely affixed position or arrangement about the periphery of the wheel rim berm. It is also envisioned that the edge or lip 18 may include a foot (consistent with the other embodiments described above).

It is envisioned that the guard 10 may be positioned to cover the rim of a wheel, wherein a user will grasp the handle 14 (depending from the body 12) and approximately align the guard 10 in a manner so that the returnably-resilient seal 16 (disposed along the circumferential peripheral edge or lip 18 of the guard 10) comes into contact with the berm of the wheel rim. The user will press the handle 14 to urge the body 12 and the seal 16 against the berm, wherein the seal 16 deforms from its relaxed state to form a double-layer about the berm, with one layer above and one layer below the berm. In this arrangement, the user may then apply and then remove a cleaning agent or other application/dressing to the exposed tire without concern for the agent, application, and/or dressing contacting and otherwise marring the surface and/or damaging the integrity of the material comprising the rim wheel. It is further envisioned that a bead of adhesive may be applied to some or all of the wheel rim berm to temporarily apply the guard 10 to the wheel rim and provide a hands-free opportunity for the user to apply and then remove the cleaning agent, application, and/or dressing from the expose tire. In an alternative embodiment, the bead of adhesive may be applied to at or along the lip 18 of the guard 10, with the user applying the adhesive to the berm of the wheel rim by urging the guard 10 into position against the wheel rim. In another alternative embodiment, adhesive may be applied to the berm of the wheel rim and the lip 18 of guard 10.

It is to be understood that the embodiments and claims are not limited in its application to the details of construction and arrangement of the components set forth in the description and illustrated in the drawings. Rather, the description and the drawings provide examples of the embodiments envisioned, but the claims are limited to the specific embodiments. The embodiments and claims disclosed herein are further capable of other embodiments and of being practiced and carried out in various ways. Also, it is to be understood that the phraseology and terminology employed herein are for the purposes of description and should not be regarded as limiting the claims.

Accordingly, those skilled in the art will appreciate that the conception upon which the application and claims are based may be readily utilized as a basis for the design of other structures, methods, and systems for carrying out the several purposes of the embodiments and claims presented in this application. It is important, therefore, that the claims be regarded as including such equivalent constructions.

Furthermore, the purpose of the foregoing Abstract is to enable the U.S. Patent and Trademark Office and the public generally, and especially including the practitioners in the art who are not familiar with patent and legal terms or phraseology, to determine quickly from a cursory inspection the nature and essence of the technical disclosure of the application. The Abstract is neither intended to define the claims of the application, nor is it intended to be limiting to the scope of the claims in any way. It is intended that the application is defined by the claims appended hereto.

What is claimed is:

1. A wheel rim guard comprising:
a body including an outer surface and an inner surface, the outer surface and the inner surface each radiating from a central point and the outer surface and the inner surface each co-terminating and defining a circumferential peripheral edge;
a returnably-resilient seal disposed along the circumferential peripheral edge, the seal including an outer layer and an inner core, the outer layer comprising non-reactive material, and the inner core comprising compressible, returnably-resilient material, the seal engaging a wheel rim; and,
a handle depending from the outer surface of the body.

2. The guard of claim 1, wherein the body comprises a first reinforcement element.

3. The guard of claim 2, wherein the first reinforcement element is disposed at the center of the body.

4. The guard of claim 3, wherein the body comprises a second reinforcement element.

5. The guard of claim 4, wherein the second reinforcement element is disposed in spaced-relation to the first reinforcement element.

6. The guard of claim 1, wherein the seal is displaced to form a first elongated portion and a second elongated portion, the first elongated portion and the second elongated portion forming a double-barrier of impermeability about the wheel rim.

7. The guard of claim 1, wherein the seal further comprises a defined pre-set indentation formed between the circumferential margins of the seal, the defined pre-set indentation for aligning with the wheel rim, and wherein the defined pre-set indentation forms a first elongated portion and a second elongated portion.

8. The guard of claim 1 further comprising a foot depending from the peripheral edge.

9. The guard of claim 1, wherein the body further comprises a plurality of support spines.

10. A wheel rim guard comprising:
a dome-shaped body including an outer surface and an inner surface, the outer surface and the inner surface comprising curvilinear forms, the outer surface and the inner surface each radiating from a central point and the outer surface and the inner surface each co-terminating and defining a circumferential peripheral edge;
a returnably-resilient seal disposed along the circumferential peripheral edge, the seal including an outer layer and an inner core, the outer layer comprising non-reactive material, and the inner core comprising compressible, returnably-resilient material; and,
a handle depending from the outer surface of the body.

11. The guard of claim 10, wherein the body comprises a uniform thickness.

12. The guard of claim 10, wherein the body comprises a non-uniform thickness, the body having a greater thickness at the center and a lesser thickness at the circumferential peripheral edge.

13. The guard of claim 10, wherein the body comprises a first reinforcement element.

14. The guard of claim 10, wherein the seal engages a wheel rim and is displaced to form a first elongated portion and a second elongated portion, the first elongated portion and the second elongated portion forming a double-barrier of impermeability about the wheel rim.

15. The guard of claim 10, wherein the seal further comprises a defined pre-set indentation formed between the circumferential margins of the seal, the defined pre-set indentation for aligning with a wheel rim, and wherein the defined pre-set indentation forms a first elongated portion and a second elongated portion, the first elongated portion and the second elongated portion forming a double-barrier of impermeability about the wheel rim.

16. The guard of claim 10 further comprising a foot depending from the peripheral edge.

17. The guard of claim 10, wherein the body further comprises a plurality of support spines.

18. The guard of claim 10, wherein the body further comprises a rotatable platform supporting the handle.

19. The guard of claim 10 further comprising a linkage intermediately disposed between the handle and the seal.

20. The guard of claim 19, wherein the handle articulates to lengthen and shorten the linkage.

* * * * *